US012710600B2

(12) United States Patent
Kimura

(10) Patent No.: US 12,710,600 B2
(45) Date of Patent: Aug. 18, 2026

(54) FERRULE FOR OPTICAL CONNECTOR, OPTICAL CONNECTOR, AND METHOD FOR MANUFACTURING OPTICAL CONNECTOR

(71) Applicant: Fujikura Ltd., Tokyo (JP)

(72) Inventor: Akifumi Kimura, Sakura (JP)

(73) Assignee: Fujikura Ltd., Tokyo (JP)

( * ) Notice: Subject to any disclaimer, the term of this patent is extended or adjusted under 35 U.S.C. 154(b) by 223 days.

(21) Appl. No.: 18/253,397

(22) PCT Filed: Oct. 7, 2021

(86) PCT No.: PCT/JP2021/037103
§ 371 (c)(1),
(2) Date: May 18, 2023

(87) PCT Pub. No.: WO2022/176259
PCT Pub. Date: Aug. 25, 2022

(65) Prior Publication Data

US 2024/0012207 A1 Jan. 11, 2024

(30) Foreign Application Priority Data

Feb. 17, 2021 (JP) ................................ 2021-023589

(51) Int. Cl.
*G02B 6/36* (2006.01)
*G02B 6/38* (2006.01)
*G02B 6/44* (2006.01)

(52) U.S. Cl.
CPC ......... *G02B 6/3839* (2013.01); *G02B 6/3652* (2013.01); *G02B 6/3672* (2013.01); (Continued)

(58) Field of Classification Search
CPC .. G02B 6/3839; G02B 6/3885; G02B 6/4403; G02B 6/448; G02B 6/3834; (Continued)

(56) References Cited

U.S. PATENT DOCUMENTS 5,815,621 A * 9/1998 Sakai .................. G02B 6/3834 264/1.24
6,604,866 B1 * 8/2003 Kang .................. G02B 6/3885 385/60
(Continued)

FOREIGN PATENT DOCUMENTS

JP H09-292547 A 11/1997
JP H11-084177 A 3/1999
(Continued)

OTHER PUBLICATIONS

International Search Report issued in corresponding International Application No. PCT/JP2021/037103 mailed Dec. 21, 2021 (2 pages).

*Primary Examiner* — Thomas A Hollweg
*Assistant Examiner* — Erin D Chiem
(74) *Attorney, Agent, or Firm* — Osha Bergman Watanabe & Burton LLP

(57) ABSTRACT

A ferrule for an optical connector includes: a body portion having fiber holes into which optical fibers are inserted, and a connecting end face through which the fiber holes are opened. The fiber holes include: first fiber holes disposed at a predetermined pitch in a first direction on the connecting end face; and second fiber holes disposed at the predetermined pitch in the first direction and at positions different from positions of the first fiber holes in a second direction orthogonal to the first direction. The positions of the second fiber holes are shifted by substantially half the predetermined pitch in the first direction with respect to the positions of the first fiber holes. A rear side of the body portion is opposite to the connecting end face in an insertion direction of the fiber holes.

2 Claims, 11 Drawing Sheets

(52) U.S. Cl.
CPC ......... *G02B 6/3834* (2013.01); *G02B 6/3837* (2013.01); *G02B 6/3885* (2013.01); *G02B 6/3833* (2013.01); *G02B 6/4403* (2013.01)

(58) Field of Classification Search
CPC .. G02B 6/3652; G02B 6/3672; G02B 6/3833; G02B 6/3837; G02B 6/368
See application file for complete search history.

(56) References Cited

U.S. PATENT DOCUMENTS

| | | | | |
|---|---|---|---|---|
| 6,910,808 B2 * | 6/2005 | Shigenaga | G02B 6/3837 | 385/71 |
| 2002/0146213 A1 * | 10/2002 | Shigenaga | G02B 6/3839 | 385/78 |
| 2002/0168150 A1 * | 11/2002 | Shiino | G02B 6/3865 | 385/71 |
| 2009/0097501 A1 * | 4/2009 | Gandal | H04L 45/742 | 370/465 |
| 2013/0156377 A1 * | 6/2013 | DeMeritt | G02B 6/4415 | 385/59 |

FOREIGN PATENT DOCUMENTS

| | | | |
|---|---|---|---|
| JP | 2001-318275 | A | 11/2001 |
| JP | 2003-029087 | A | 1/2003 |
| JP | 2003-029089 | A | 1/2003 |
| JP | 2005-309009 | A | 11/2005 |
| JP | 2011-013635 | A | 1/2011 |
| JP | 5075562 | B2 * | 11/2012 |
| JP | 2013-171208 | A | 9/2013 |

* cited by examiner 12 (12A)
S
14
10b
1A
30
10a
G1
G2
11a 11b
11
12 (12B)
10c
15a
15
10
+Z
+X
-X
-Z 1C
10
15
15a
10b
14
10c
S
12 (12C)
12 (12B)
12 (12A)
12
11a 11b
11
10a
G1
G2
G3
+Z
-Z
+X
-X

FERRULE FOR OPTICAL CONNECTOR, OPTICAL CONNECTOR, AND METHOD FOR MANUFACTURING OPTICAL CONNECTOR

TECHNICAL FIELD

The present invention relates to a ferrule for an optical connector, the optical connector, and a method for manufacturing the optical connector.

Priority is claimed on Japanese Patent Application No. 2021-023589, filed Feb. 17, 2021, the content of which is incorporated herein by reference.

BACKGROUND

Patent Document 1 discloses a ferrule for an optical connector having a plurality of fiber holes arranged two-dimensionally on a connecting end face. A plurality of guide grooves extending rearward are provided at respective rear end portions of the plurality of fiber holes in the insertion direction.

PATENT LITERATURE

Patent Document 1

Japanese Unexamined Patent Application, First Publication No. 2001-318275

In the ferrule of Patent Document 1, a plurality of guide grooves are formed stepwise, and the dimensions in each step in the insertion direction are constant. In this case, the size of the ferrule in the insertion direction increases according to the number of rows of fiber holes, that is, the number of stages of guide grooves.

SUMMARY

One or more embodiments of the present invention suppress an increase in the size of a ferrule for an optical connector in an insertion direction even if fiber holes are arranged in multiple rows.

A ferrule for an optical connector according to one or more embodiments of the present invention includes a body portion having a plurality of fiber holes into which a plurality of optical fibers are inserted, and a connecting end face through which the plurality of fiber holes are opened, in which the plurality of fiber holes include a plurality of first fiber holes arranged at a predetermined pitch in a first direction on the connecting end face, and a plurality of second fiber holes which are disposed at positions different from positions of the plurality of first fiber holes in a second direction orthogonal to the first direction and arranged at the pitch in the first direction, the plurality of second fiber holes are disposed at positions shifted by substantially half the pitch in the first direction with respect to the plurality of first fiber holes, when a side opposite to the connecting end face in an insertion direction of the plurality of fiber holes is rear, in an inside of the body portion, a plurality of first guide grooves extending rearward from respective rear end portions of the plurality of first fiber holes and a plurality of second guide grooves extending rearward from respective rear end portions of the plurality of second fiber holes are formed, and the plurality of second guide grooves are longer in the insertion direction than the plurality of first guide grooves.

According to the ferrule for an optical connector of the embodiments described above, it is possible to easily insert each of the plurality of optical fibers into the second fiber hole by being moved along the second guide groove having a longer dimension in the insertion direction. At this time, the upper surfaces of the plurality of optical fibers (hereinafter referred to as second optical fibers) inserted into the second fiber holes form concave portions. Since the first fiber hole and the second fiber hole are in a so-called hexagonal packing arrangement, it is possible to guide the first optical fiber to the first guide groove located behind the first fiber hole by having the lower surface of the other optical fiber (hereinafter referred to as first optical fiber) fit into the concave portion formed by the second optical fiber. Thereafter, the first guide groove can guide the first optical fiber to the first fiber hole. In this manner, since the concave portion formed by the second optical fiber guides the first optical fiber to the first fiber hole, it is possible to smoothly insert the first optical fiber into the first fiber hole even if the dimension of the first guide groove in the insertion direction is short. Further, compared to the case where the first guide groove and the second guide groove have the same dimension, it is possible to reduce the dimension in the insertion direction of the ferrule for an optical connector.

Here, the plurality of fiber holes may have a plurality of third fiber holes which are disposed at positions different from the positions of the plurality of first fiber holes and the positions of the plurality of second fiber holes in the second direction and are arranged at the pitch in the first direction, the plurality of second fiber holes may be located between the plurality of first fiber holes and the plurality of third fiber holes in the second direction, a plurality of third guide grooves extending rearward from respective rear end portions of the plurality of third fiber holes may be formed inside the body portion, and the plurality of third guide grooves may be longer in the insertion direction than the plurality of first guide grooves.

Further, when a side closer to the plurality of first fiber holes in the second direction is defined as the upper side and a side closer to the plurality of second fiber holes is defined as the lower side, a window communicating with the internal space of the body portion may be formed on the upper surface of the body portion.

An optical connector according to one or more embodiments of the present invention includes a plurality of optical fibers and the ferrule for an optical connector according to any one of the above embodiments, in which the plurality of optical fibers each include a bare portion and a coated portion covering the bare portion, and the outer diameter of the coated portion and the pitch may be substantially equal to each other.

Further, a method for manufacturing an optical connector according to one or more embodiments of the present invention, includes: preparing the ferrule for an optical connector according to any one of the above embodiments; inserting a plurality of second optical fibers into the plurality of second fiber holes through the plurality of second guide grooves; and moving a plurality of first optical fibers along surfaces of the plurality of second optical fibers to be inserted into the plurality of first fiber holes individually.

According to one or more embodiments of the present invention, it is possible to suppress an increase in the size of a ferrule for an optical connector in an insertion direction even if fiber holes are arranged in multiple rows.

DETAILED DESCRIPTION

First Embodiments

Hereinafter, a ferrule for an optical connector, the optical connector, and a method for manufacturing the optical connector of the first embodiments will be described with reference to the drawings.

Figure 1:
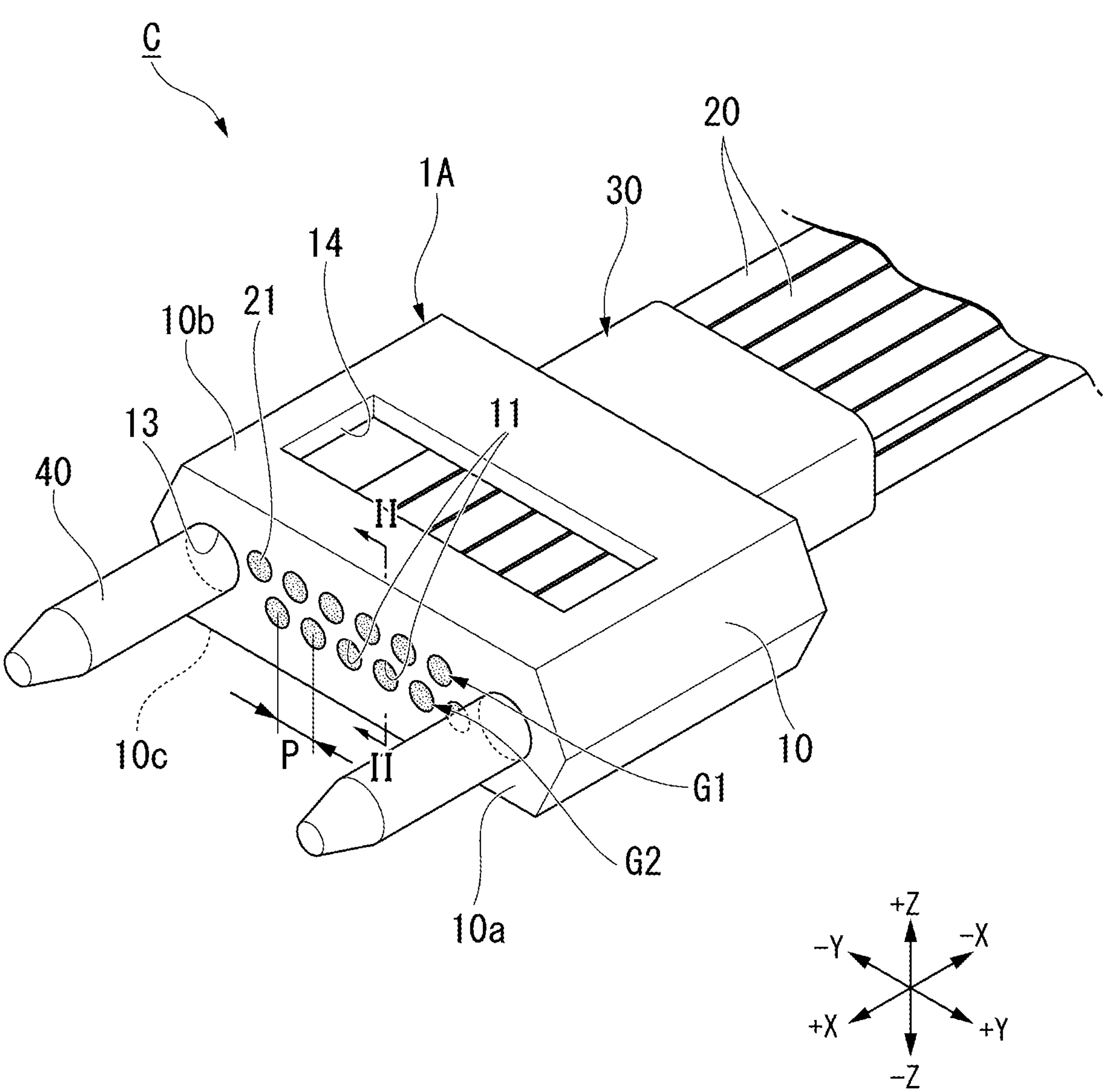
FIG. 1 is a perspective view of an optical connector according to first embodiments.

As shown in FIG. 1, an optical connector C includes a ferrule for the optical connector (hereinafter simply referred to as a ferrule 1A), a plurality of optical fibers 20, a boot 30, and two guide pins 40. The ferrule 1A has a body portion 10.

Figures 2, 3:
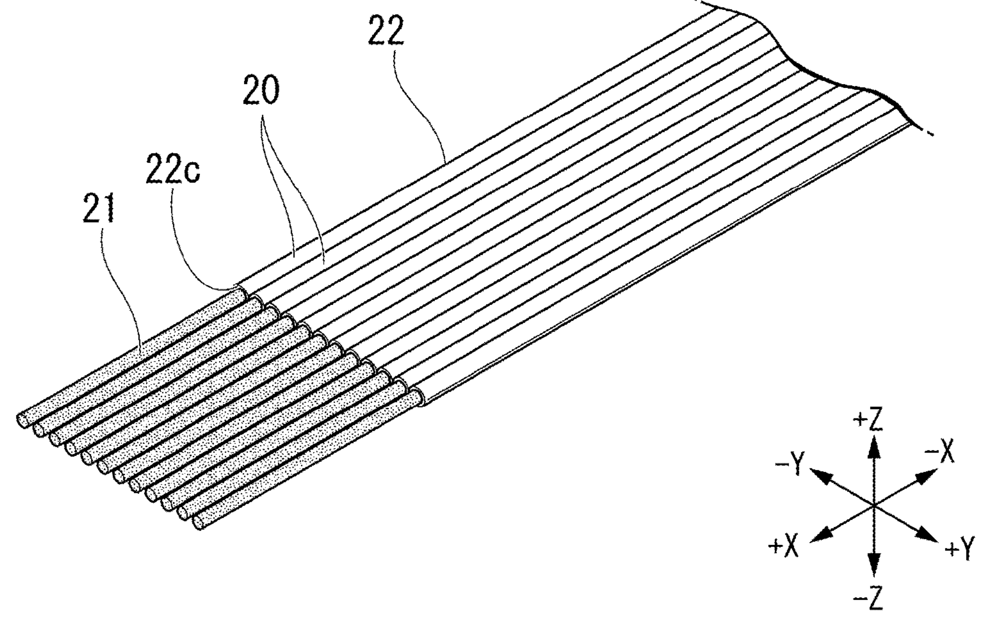
FIG. 2 is a cross-sectional view taken along line II-II in FIG. 1, omitting an optical fiber.
FIG. 3 is a perspective view of an optical fiber in the first embodiments.

The body portion 10 has a plurality of fiber holes 11 through which the plurality of optical fibers 20 are inserted, and a connecting end face 10*a* through which the plurality of fiber holes 11 are opened. The plurality of fiber holes 11 are configured to be a plurality (two in the present embodiments) of hole groups. In the present specification, each hole group may be referred to as "first hole group G1", "second hole group G2", or the like for ease of explanation. Each hole group includes a plurality of fiber holes 11 arranged side by side at a predetermined pitch P in a predetermined direction. Further, as shown in FIG. 2, guide grooves 12 are provided at the end portions of the plurality of fiber holes 11 opposite to the connecting end face 10*a*. The fiber holes included in the first hole group G1 and the second hole group G2 may be called the first fiber hole, the second fiber hole, and the like. In addition, the guide groove 12 provided at the rear end of the first fiber hole may be called "first guide groove 12A", and the guide groove 12 provided at the rear end of the second fiber hole may be called "second guide groove 12B". The optical fibers 20 are inserted through the first hole group G1 and the second hole group G2 may be called "first fiber group F1" and "second fiber group F2", respectively.

Note that the number of fiber holes included in each hole group can be changed as appropriate, and may be two or more. Further, the ferrule 1A may have a portion other than the body portion 10.

Direction Definition

Here, in the present embodiments, the direction in which the optical fiber 20 is inserted through the fiber hole 11 is referred to as the insertion direction X. Along the insertion direction X, the side closer to the connecting end face 10*a* (+X side) is called the forward or tip side, and the opposite side (−X side) is called the rearward or proximal side. The plurality of fiber holes 11 are two-dimensionally arranged in the first direction Y and the second direction Z on the connecting end face 10*a*. The first direction Y is also the direction in which the plurality of fiber holes 11 are arranged in each fiber group. One side in the first direction Y is called the +Y side, and the other side is also called the −Y side. The second direction Z is a direction perpendicular to the first direction Y on the connecting end face 10*a*. A side closer to the first hole group G1 (+Z side) in the second direction Z is called upper side, and a side closer to the second hole group G2 (−Z side) is called lower side. A cross section perpendicular to the insertion direction X is called a "cross section".

In the present embodiments, the insertion direction X is orthogonal to the first direction Y and the second direction Z. However, as long as the insertion direction X intersects the first direction Y and the second direction Z, the insertion direction X may not necessarily need to be orthogonal.

As shown in FIG. 3, the optical fiber 20 has a bare portion 21 and a coated portion 22 covering the bare portion 21. The bare portion 21 includes a core and a cladding (not shown). The cladding has a lower refractive index than the core and covers the core. Therefore, light can be confined inside the core. The material of the bare portion 21 may be glass or plastic. At the front end portion of each optical fiber 20, the coated portion 22 is removed, and the bare portion 21 is exposed. A plurality of optical fibers 20 inserted through the same hole group may be connected to each other to be in the state of a ribbon. For example, the optical connector C of the present embodiments may include a first ribbon that is inserted through the first hole group G1 and a second ribbon that is inserted through the second hole group G2.

As shown in FIG. 1, the body portion 10 has the connecting end face 10*a*, a body portion upper surface (upper surface) 10*b*, and a body portion lower surface (lower surface) 10*c*. A window 14 communicating with the internal space S of the body portion 10 is formed in the body portion upper surface 10*b*. The window 14 is positioned closer to the first hole group G1 than to the second hole group G2. The formation of the window 14 improves visibility when the optical fiber 20 is inserted through the fiber hole 11. Further, by injecting an adhesive into the internal space S through the window 14, the optical fiber can be fixed to the ferrule 1A. However, the window 14 may not be formed in the body portion 10. A plurality of fiber holes 11 and two guide pin holes 13 are opened in the connecting end face 10*a*. A guide pin 40 is inserted through each guide pin hole 13. Further, a boot insertion opening 15 into which a boot 30 is inserted is provided at the rear of the body portion 10. A contact surface 15*a* is provided at the tip portion of the inner surface of the boot insertion opening 15. The optical connector C in FIG. 1 is male and has the guide pins 40, but the female optical connector C (not shown) may not have the guide pins 40. The two optical connectors C are aligned by inserting the guide pin 40 of the male optical connector C into the guide pin hole 13 of the female optical connector C.

In the present embodiments, a so-called "Hexagonal packing arrangement" is used for the two-dimensional array of a plurality of fiber holes 11. Specifically, the positions of the fiber holes 11 in the first direction Y are shifted by substantially half the pitch P between the first hole group G1 and the second hole group G2. Note that "substantially half" includes the case where the deviation amount of the fiber holes 11 in the first direction Y can be considered to be half the pitch P if manufacturing errors are eliminated. The pitch P may be substantially equal to the outer diameter R (see FIG. 4D) of the coated portion 22 of the optical fiber 20. The term "substantially equal" includes the case where the pitch P and the outer diameter R can be considered equal if manufacturing errors are eliminated. For example, when the outer diameter R of the coated portion 22 of the optical fiber 20 is 200 μm, the pitch P may be 200 μm.

As shown in FIG. 2, the fiber hole 11 has a small diameter portion 11*a* and a large diameter portion 11*b*. The small diameter portion 11*a* opens at the connecting end face 10*a*, and extends along the insertion direction X. The large diameter portion 11*b* communicates with the small diameter portion 11*a* and extends rearward from the rear end of the small diameter portion 11*a*. The inner diameter of the small diameter portion 11*a* is constant along the insertion direction X. The inner surface at the front end portion of the large diameter portion 11*b* is tapered such that the inner diameter decreases toward the front. The inner diameter at the front end of the large diameter portion 11*b* is equal to the inner diameter of the small diameter portion 11*a*, and the inner diameter at the rear end of the large diameter portion 11*b* is larger than the inner diameter of the small diameter portion 11*a*.

The guide groove 12 extends rearward from the rear end portion of the fiber hole 11 (large diameter portion 11*b*). The guide groove 12 is arc-shaped (U-shaped) opening upward in a cross-sectional view. The inner diameter at the front end of the guide groove 12 is equal to the inner diameter at the rear end of the large diameter portion 11*b*, and the guide groove 12 may have a tapered structure in which the inner diameter increases toward the rear. The depth of the groove at the rear end of the guide groove 12 in the second direction Z may be smaller than the depth of the groove at the front end of the guide groove 12. Note that the guide groove 12 may be V-shaped or the like opening upward in a cross-sectional view.

The plurality of guide grooves 12 are formed stepwise. Specifically, the rear end of the first guide groove 12A is formed on the front side than the rear end of the second guide groove 12B. Thereby, all of the guide grooves 12 are exposed to the internal space S, making it easier for the operator to visually recognize the guide grooves through the window 14. Further, as shown in FIG. 2, the dimension of the first guide groove 12A in the insertion direction X is set shorter than the dimension of the second guide groove 12B.

The guide groove 12 serves to guide the optical fiber 20 inserted from behind into the fiber hole 11. Note that the structures of the fiber holes 11 and the guide grooves 12 may be changed as appropriate. For example, the large diameter portion 11*b* may be removed and the guide groove 12 may be directly connected to the small diameter portion 11*a*. The guide groove 12 may have a tapered structure in which the inner diameter increases toward the rear.

The boot 30 has a tubular shape extending along the insertion direction X. The boot 30 is inserted into the body portion 10 so that the front surface of the boot 30 contacts the contact surface 15*a*. The inside of the boot 30 communicates with the internal space S of the body portion 10 and serves as an insertion opening for the optical fiber 20.

Next, an example of a method for manufacturing the optical connector C configured as described above will be described.

In the present embodiments, there are two processes in which the fiber group is inserted into the corresponding hole group. In the present specification, each process may be called a "first insertion process" and a "second insertion process".

Figure 4A:
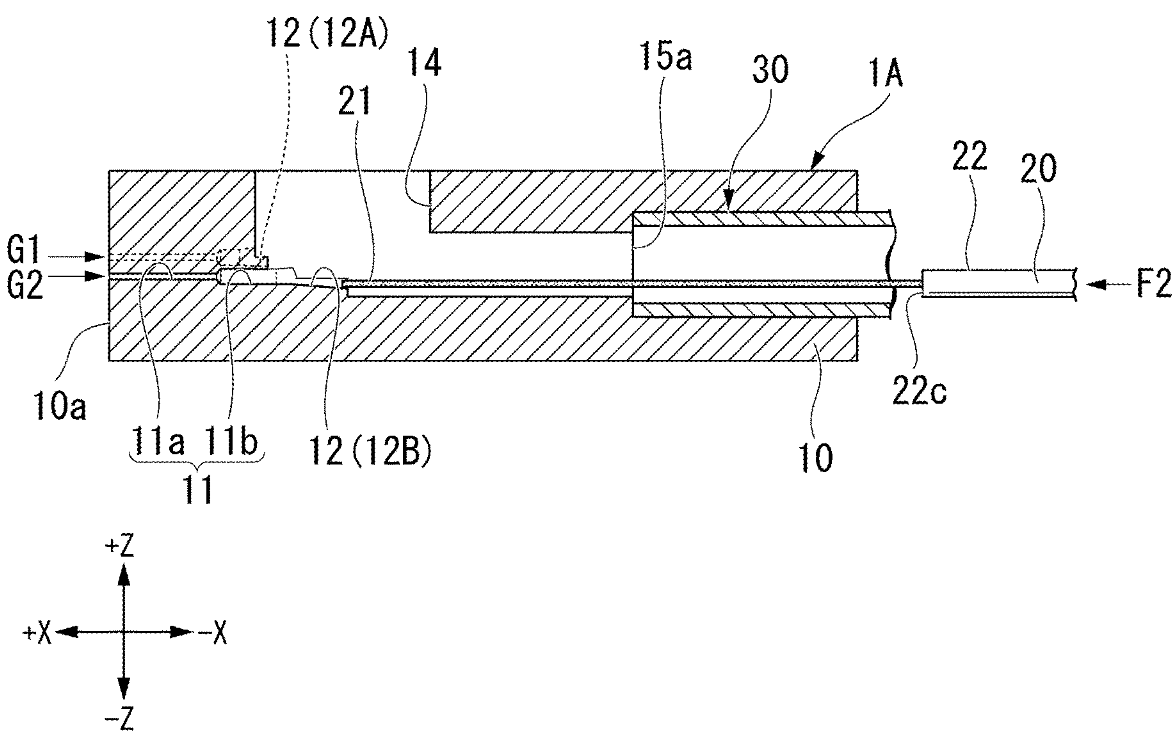
FIG. 4A is a view showing how the optical fiber is inserted into a ferrule and a boot in FIG. 2.
Figure 4B:
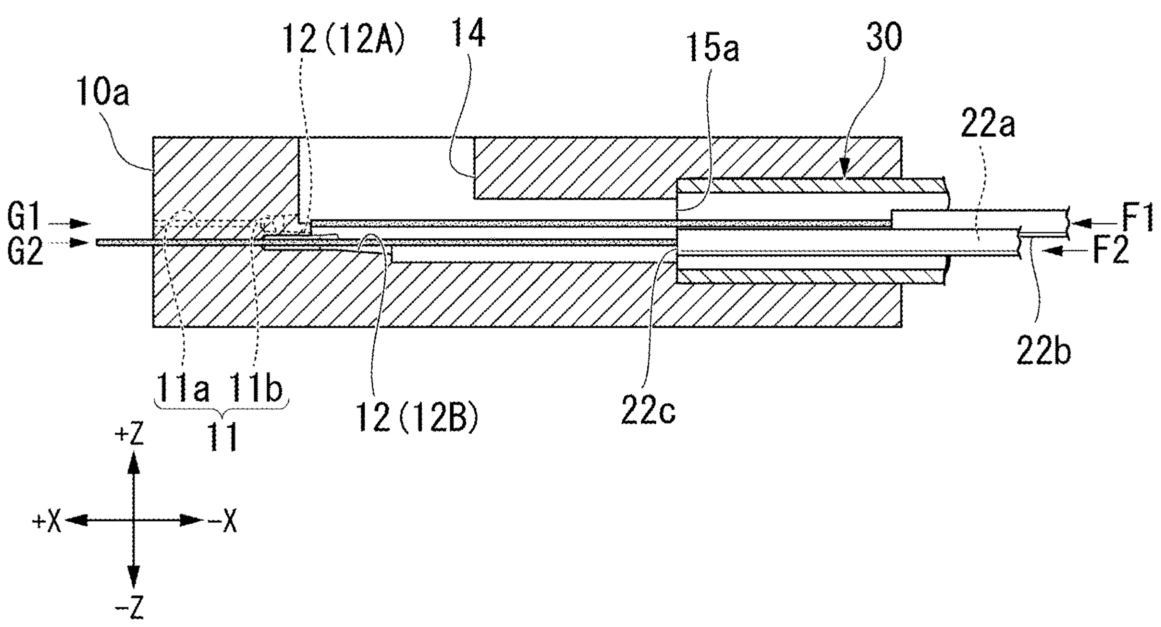
FIG. 4B is a diagram showing a step following FIG. 4A.

The first insertion process is a process of inserting the fiber group into the corresponding hole group mainly using the guide groove 12. In the present embodiments, this process is applied to the second fiber group F2. The first insertion process will be specifically described below with reference to FIGS. 4A and 4B.

First, the operator brings each bare portion 21 of the second fiber group F2 into contact with the inner surface of the second guide groove 12B. When the optical fibers 20 of the second fiber group F2 are connected to each other to be in the state of a ribbon, the plurality of optical fibers 20 may be moved simultaneously to contact the inner surface of the second guide groove 12B. Alternatively, each optical fiber 20 may be moved individually. At this time, the operator can visually recognize each bare portion 21 and the second guide groove 12B through the window 14. When the optical fiber 20 is pushed forward in this state, the bare portion 21 moves along the inner surface of the second guide groove 12B and the inner surface of the large diameter portion 11*b*, and is inserted into the small diameter portion 11*a*.

The second insertion process is a process of inserting the fiber group into the corresponding hole group using a concave portion 22*a* formed by the upper surface of the optical fiber 20 that is already inserted in the fiber hole 11, after the first insertion process. In the present embodiments, this process is applied to the first fiber group F1. The second insertion process will be specifically described below with reference to FIGS. 4B, 4C, and 4D.

Figure 4C:
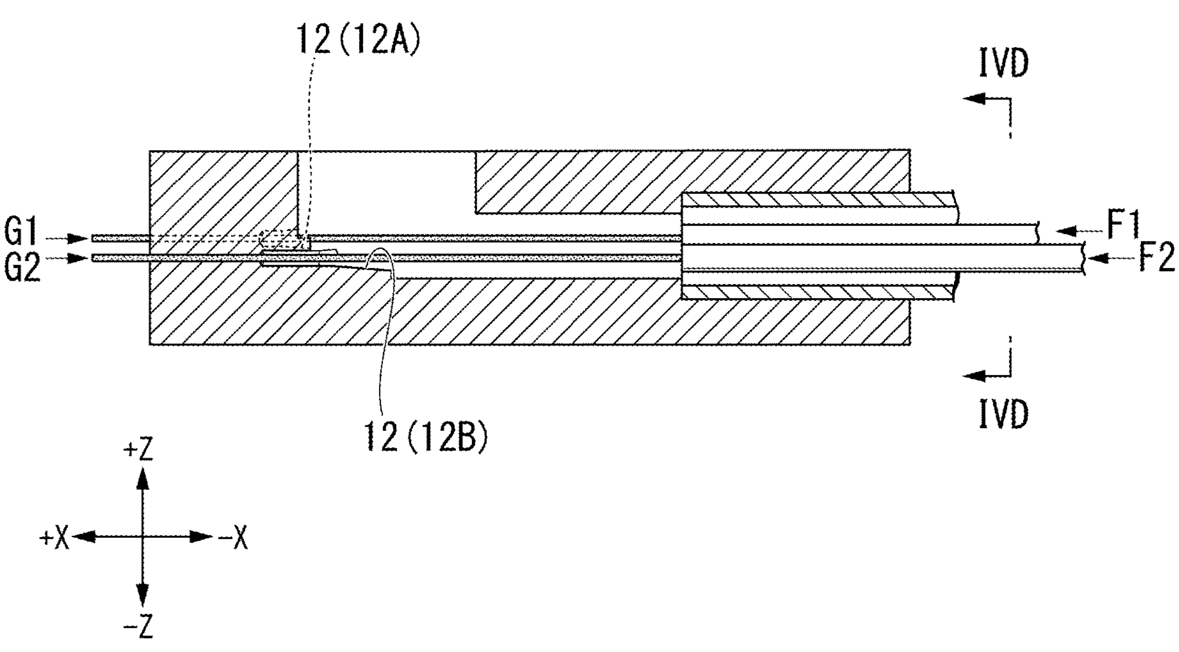
FIG. 4C is a diagram showing a step following FIG. 4B.
Figure 4D:
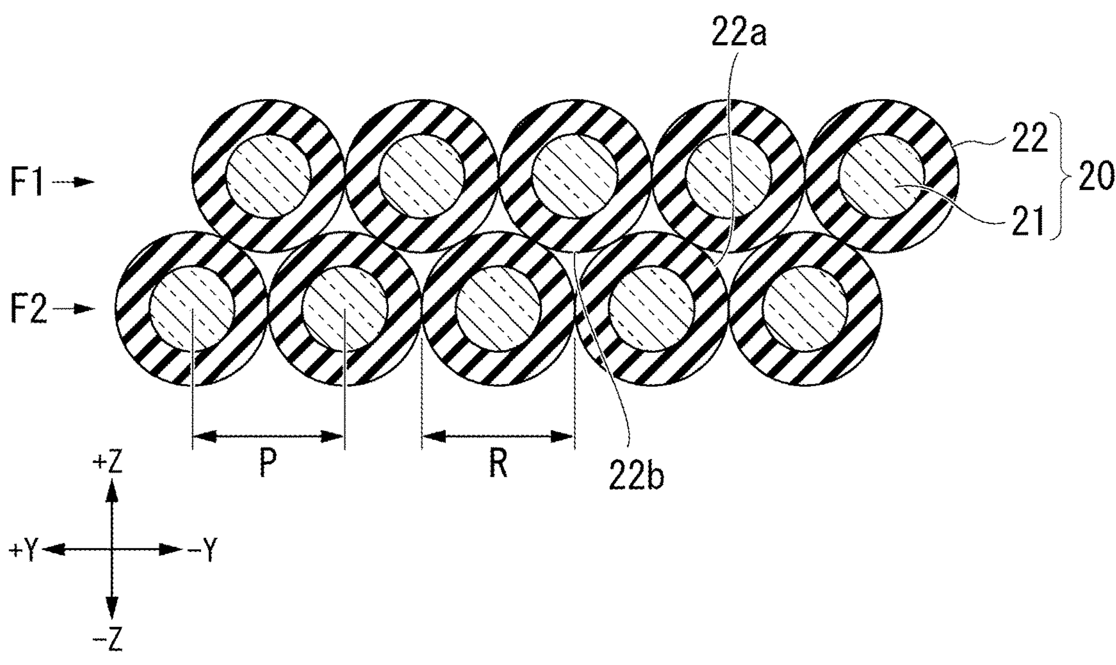
FIG. 4D is a cross-sectional view taken along line IVD-IVD of FIG. 4C.

As shown in FIG. 4D, a plurality of concave portions 22*a* are formed in the upper portion of the second fiber group F2 already inserted into the fiber holes 11 through the first insertion process. Each concave portion 22*a* is formed by the upper surfaces of the coated portions 22 of two adjacent optical fibers 20 in the first direction Y. When inserting the first fiber group F1 into the first hole group G1, the lower surface 22*b* of each coated portion 22 of the first fiber group F1 is fitted into each concave portion 22*a* of the second fiber group F2. In this state, the optical fiber 20 (first optical fiber) included in the first fiber group F1 is moved forward. In other words, the first fiber group F1 is moved forward with respect to the second fiber group F2, in a state in which the first fiber group F1 and the second fiber group F2 are in a hexagonal packing arrangement (see FIG. 4D). Here, the arrangement pitch P of each fiber hole 11 is substantially equal to the outer diameter R of the coated portion 22 of the optical fiber 20. Therefore, when the second fiber group F2 has been inserted through the second hole group G2, a relative position in the first direction Y and the second direction Z between each bare portion 21 of the first fiber group F1 and the first fiber hole can be determined, without using the guide groove 12.

When the optical fiber 20 (first optical fiber) of the first fiber group F1 moves forward by a predetermined amount, the first optical fiber reaches the inside of the first guide groove 12A. Thereafter, the bare portion 21 can be guided toward the small diameter portion 11*a* through the first guide groove 12A and the large diameter portion 11*b*.

As described above, in the second insertion process, it is possible to guide the optical fiber 20 into the fiber hole 11 through the concave portion 22*a*. Therefore, even if the dimension in the insertion direction X of the first guide groove 12A is shorter than the dimension of the second guide groove 12B, it is possible to smoothly insert the first fiber group F1 into the first hole group G1.

After inserting the optical fiber 20 through the fiber hole 11, if the bare portion 21 protrudes from the connecting end face 10*a* as shown in FIG. 4C, the protruding bare portion 21 is cut off. The cutting of the bare portion 21 may be performed at the same time as the polishing of the connecting end face 10*a*. In this case, the position of the end surface of each bare portion 21 can be aligned with the position of the connecting end face 10*a* with high accuracy.

As described above, a ferrule 1A according to the present embodiments includes a body portion 10 having a plurality of fiber holes 11 through which a plurality of optical fibers 20 are inserted, and a connecting end face 10*a* through which the plurality of fiber holes 11 are opened, in which the plurality of fiber holes 11 include a plurality of first fiber holes (first hole group G1) arranged at a predetermined pitch P in a first direction Y on the connecting end face 10*a*, and a plurality of second fiber holes (second hole group G2) which are disposed at positions different from positions of the plurality of first fiber holes in a second direction Z orthogonal to the first direction Y and arranged at the pitch P in the first direction Y, the plurality of second fiber holes are disposed at positions shifted by substantially half the pitch P in the first direction Y with respect to the plurality of first fiber holes, when a side opposite to the connecting end face 10*a* in an insertion direction X of the plurality of fiber holes 11 is rear, in an inside of the body portion 10, a plurality of first guide grooves 12A extending rearward from respective rear end portions of the plurality of first fiber holes and a plurality of second guide grooves 12B extending rearward from respective rear end portions of the plurality of second fiber holes are formed, and the plurality of second guide grooves 12B are longer in the insertion direction X than the plurality of first guide grooves 12A.

In the ferrule 1A having such a configuration, it is possible to easily insert the second fiber group F2 (the fiber group inserted into the hole group in the first insertion process) into the second hole group G2 by being moved along the second guide groove 12B having a longer dimension in the insertion direction X. Further, it is possible to guide the first fiber group F1 (the fiber group inserted into the hole group in the second insertion process) to the vicinity of the first hole group G1 through the concave portion 22*a* formed in the upper portion of the second fiber group F2. Therefore, even if the dimension of the first guide groove 12A in the insertion direction X is short, it is possible to smoothly insert the first fiber group F1 into the first hole group G1. Further, compared to the case where the dimensions of the first guide groove 12A and the second guide groove 12B are the same, it is possible to reduce the dimension of the ferrule 1A in the insertion direction X.

When a side closer to the first hole group G1 in the second direction Z is the upper side and a side closer to the second hole group G2 is the lower side, a window 14 that communicates with the internal space S of the body portion 10 is formed in the body portion upper surface 10*b*. According to this configuration, the operator can easily visually recognize the relative position between each optical fiber 20 and each guide groove 12 through the window 14, so that the insertability of the optical fiber 20 is further enhanced. Further, when inserting the first fiber group F1 through the first hole group G1 after inserting the second fiber group F2 through the second hole group G2, it is possible to prevent the second fiber group F2 from blocking the view. Thereby, the insertability of the optical fiber 20 can be further improved.

Further, the optical connector C of the present embodiments includes a plurality of optical fibers 20 and a ferrule 1A, and each of the plurality of optical fibers 20 includes a bare portion 21 and a coated portion 22 covering the bare portion 21. The outer diameter R of the coated portion 22 and the pitch P are substantially equal to each other. According to this configuration, when guiding the first fiber group F1 using the concave portion 22*a*, positional deviation of the first hole group G1 and the first fiber group F1 in the first direction Y and the second direction Z is reduced. Therefore, it is possible to more reliably guide the optical fiber 20 using the concave portion 22*a*.

Second Embodiments

Next, second embodiments according to the present invention will be described, but the basic configuration is the same as the configuration of the first embodiments. Therefore, the same reference numerals are given to similar components, the explanation thereof will be omitted, and only difference will be described.

Figure 5:
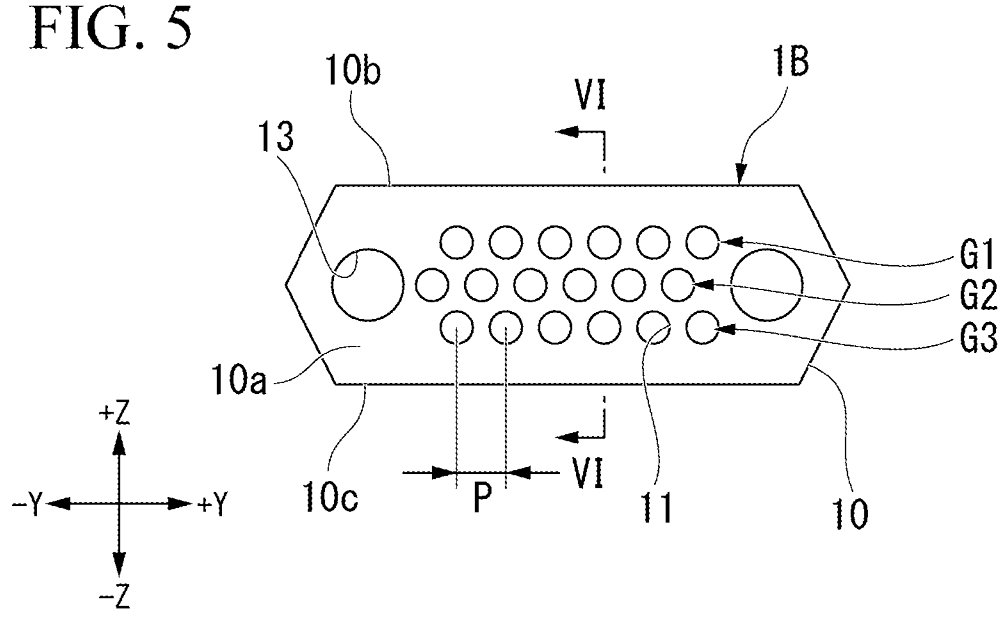
FIG. 5 is a view of a ferrule in second embodiments as viewed from a connecting end face side.
Figure 6:
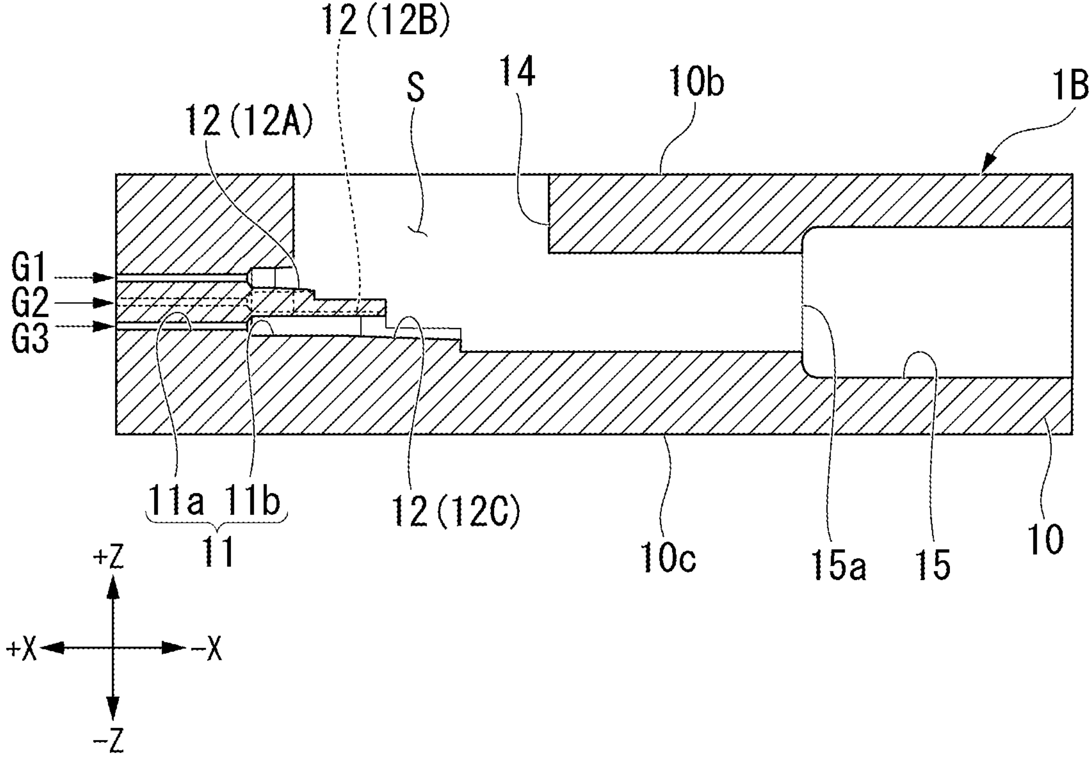
FIG. 6 is a cross-sectional view taken along line VI-VI in FIG. 5.

As shown in FIGS. 5 and 6, in the ferrule 1B of the present embodiments, the plurality of fiber holes 11 form three hole groups. In the present embodiments, each hole group is called a first hole group G1, a second hole group G2, and a third hole group G3 in order from the top. Similar to the first hole group G1 and the second hole group G2, guide grooves 12 are also provided behind each fiber hole 11 of the third hole group G3. The guide groove 12 provided behind the third hole group G3 may be called "third guide groove 12C". Further, the fiber holes 11 included in the third hole group G3 may be called "third fiber holes", and the optical fibers 20 inserted through the third hole group G3 may be called "third fiber group F3".

As shown in FIG. 5, the positions of the fiber holes 11 in the first direction Y are shifted by substantially half the pitch P between the third hole group G3 and the second hole group G2. The position of each fiber hole 11 in the first direction Y is substantially equal between the third hole group G3 and the first hole group G1. Note that "substantially equal" also includes the case where the positions of the third hole group G3 and the first hole group G1 in the first direction Y can be regarded as equal if manufacturing errors are eliminated.

As shown in FIG. 6, the dimension of the third guide groove 12C in the insertion direction X is set longer than the dimension of the first guide groove 12A. For example, the dimension of the third guide groove 12C in the insertion direction X may be set equal to the dimension of the second guide groove 12B, that is, the dimensions of the guide grooves 12 in the insertion direction X may satisfy the relationship of the third guide groove 12C≥the second guide groove 12B>the first guide groove 12A.

Next, the operation of the ferrule 1B configured as above will be described.

In the present embodiments, the first insertion process is applied to the third fiber group F3. On the other hand, the second insertion process is applied to the second fiber group F2 and the first fiber group F1.

First, the third fiber group F3 is inserted into the third hole group G3 through the first insertion process. Specifically, the third guide groove 12C guides each bare portion 21 of the third fiber group F3 to the large diameter portion 11*b* of the third hole group G3. Thereafter, each bare portion 21 is inserted from the large diameter portion 11*b* to the small diameter portion 11*a*.

Next, the second fiber group F2 is inserted into the second hole group G2 through the second insertion process. Specifically, the second fiber group F2 is guided to the second guide groove 12B, using each concave portion 22*a* formed in the upper portion of the third fiber group F3. Thereafter, the second fiber group F2 is inserted through the small diameter portion 11*a* through the second guide groove 12B and the large diameter portion 11*b*.

Next, the first fiber group F1 is inserted into the first hole group G1 through the second insertion process. Specifically, the first fiber group F1 is guided to the first guide groove 12A, using each concave portion 22*a* formed in the upper portion of the second fiber group F2. Thereafter, the first fiber group F1 is inserted through the small diameter portion 11*a* through the first guide groove 12A and the large diameter portion 11*b*.

Other procedures are the same as the procedures of the first embodiments, and therefore are omitted.

In the case of the present embodiments, the first fiber group F1 is inserted through the first hole group G1, in a state in which both the third fiber group F3 and the second fiber group F2 have been inserted through the corresponding hole groups. In this case, compared with the case where only the second fiber group F2 has been inserted through the hole group, the fluctuation and deflection of the second fiber group F2 are reduced. That is, due to the presence of the third fiber group F3 that has been inserted, the position and inclination of the concave portion 22*a* of the second fiber group F2 can be stabilized, and the second insertion process of inserting the first fiber group F1 into the first hole group G1 can be performed more reliably. In addition, since the guide function of the concave portion 22*a* of the second fiber group F2 is stabilized, the length of the first guide groove 12A can be set shorter. When inserting the second fiber group F2 into the second hole group G2, there is a possibility of being affected by fluctuation and deflection of the third fiber group F3. Regarding this point, by making the second guide groove 12B that guides the second fiber group F2 longer than the first guide groove 12A, it is possible to secure the insertability of the second fiber group F2.

As described above, in the ferrule 1B of the present embodiments, the plurality of fiber holes 11 has a plurality of third fiber holes (third hole group G3) which are disposed at positions different from the positions of the plurality of first fiber holes (first hole group G1) and the positions of the plurality of second fiber holes (second hole group G2) in the second direction Z and are arranged at the pitch P in the first direction Y, the plurality of second fiber holes are located between the plurality of first fiber holes and the plurality of third fiber holes in the second direction Z, a plurality of third guide grooves 12C extending rearward from respective rear end portions of the plurality of third fiber holes are formed inside the body portion 10, and the plurality of third guide grooves 12C are longer in the insertion direction X than the plurality of first guide grooves 12A.

According to this configuration, it is possible to reduce fluctuation and deflection of the second fiber group F2 by the presence of the third fiber group F3 that has been inserted through the third hole group G3. Thereby, the position and inclination of the concave portion 22*a* of the second fiber group F2 can be stabilized, and the first fiber group F1 can be more reliably guided to the first hole group G1. In addition, since the guide function of the concave portion 22*a* of the second fiber group F2 is stabilized, it is possible to set the length of the first guide groove 12A shorter.

Third Embodiments

Next, third embodiments according to the present invention will be described, but the basic configuration is the same as that of the first and second embodiments. Therefore, the same reference numerals are given to similar components, the explanation thereof will be omitted, and only difference will be described.

Figure 7:
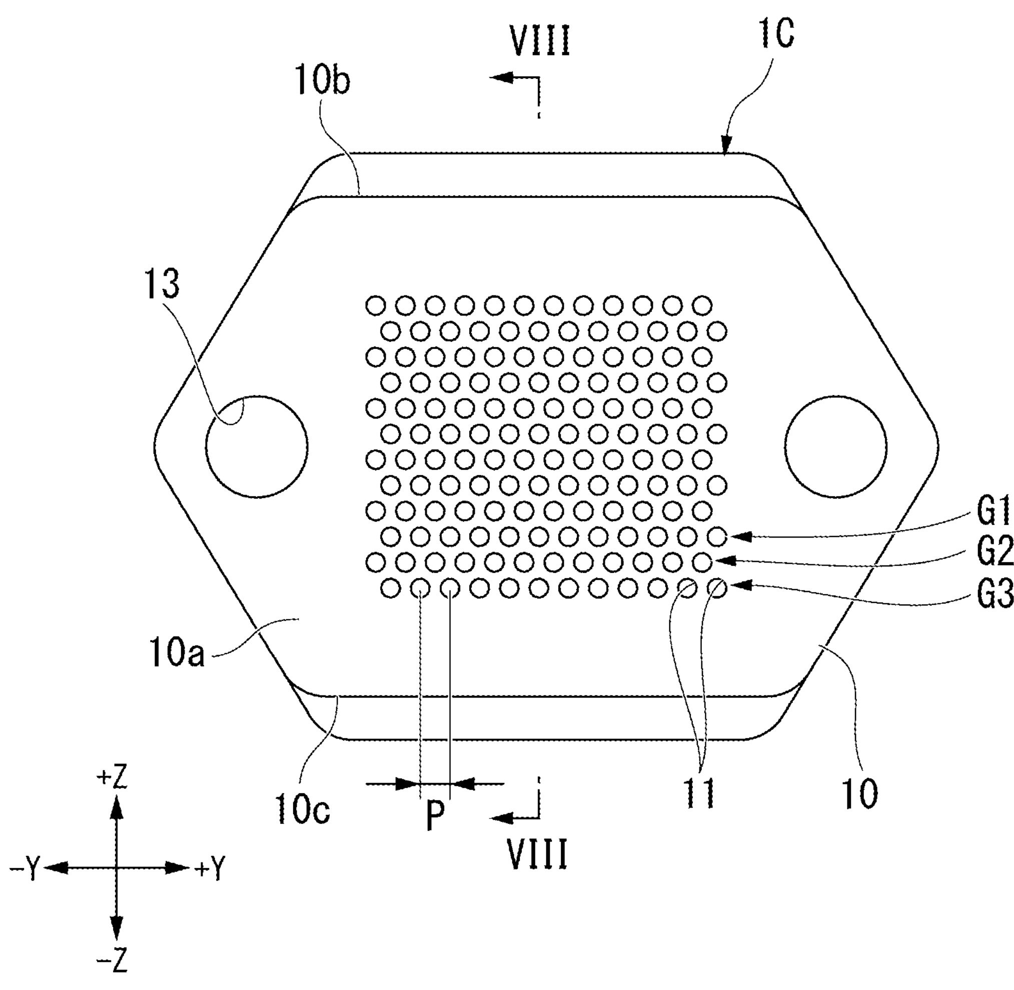
FIG. 7 is a view of a ferrule in third embodiments as viewed from a connecting end face side.
Figure 8:
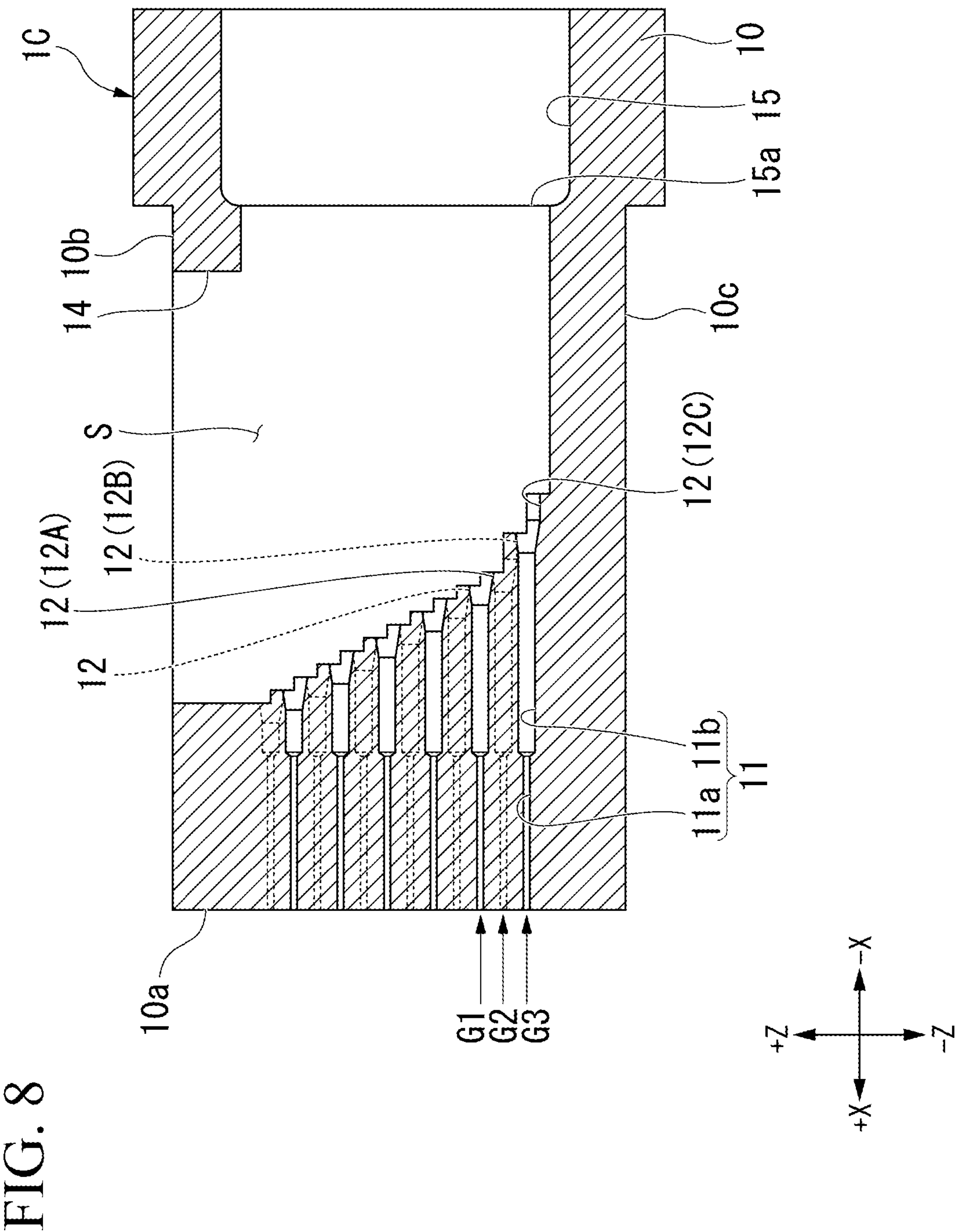
FIG. 8 is a cross-sectional view taken along line VIII-VIII in FIG. 7.

As shown in FIGS. 7 and 8, in the ferrule 1C of the present embodiments, the plurality of fiber holes 11 form twelve hole groups. In the present embodiments, the three lowest hole groups among these hole groups are called a third hole group G3, a second hole group G2, and a first hole group G1, respectively, in order from the bottom.

Note that the number of hole groups can be changed as appropriate, and may be 3 or more.

As shown in FIG. 8, the dimension in the insertion direction X of the guide groove 12 formed at the rear end of the hole group above the first hole group G1 is set to be shorter than the second guide groove 12B and the third guide groove 12C. The dimension in the insertion direction X of the guide groove 12 formed at the rear end of the hole group above the first hole group G1 may be the same as the dimension of the first guide groove 12A of the first hole group G1. For example, the dimension of the third guide groove 12C in the insertion direction X may be 0.5 mm, the dimension of the second guide groove 12B in the insertion direction X may be 0.3 mm, and the dimension of the other guide grooves 12 in the insertion direction X may be 0.1 mm.

Next, a method for manufacturing the optical connector C of the present embodiments will be described.

First, the boot 30 is inserted through the boot insertion opening 15 of the body portion 10. At this time, the front surface of the boot 30 contacts the contact surface 15*a*.

Next, an adhesive is injected into the internal space S of the body portion 10 and applied to each guide groove 12. The adhesive may be injected through the window 14 or through the boot insertion opening 15.

Next, the coated portions 22 in the tip portion of the plurality of optical fibers 20 are removed to expose the bare portions 21.

Figure 9A:
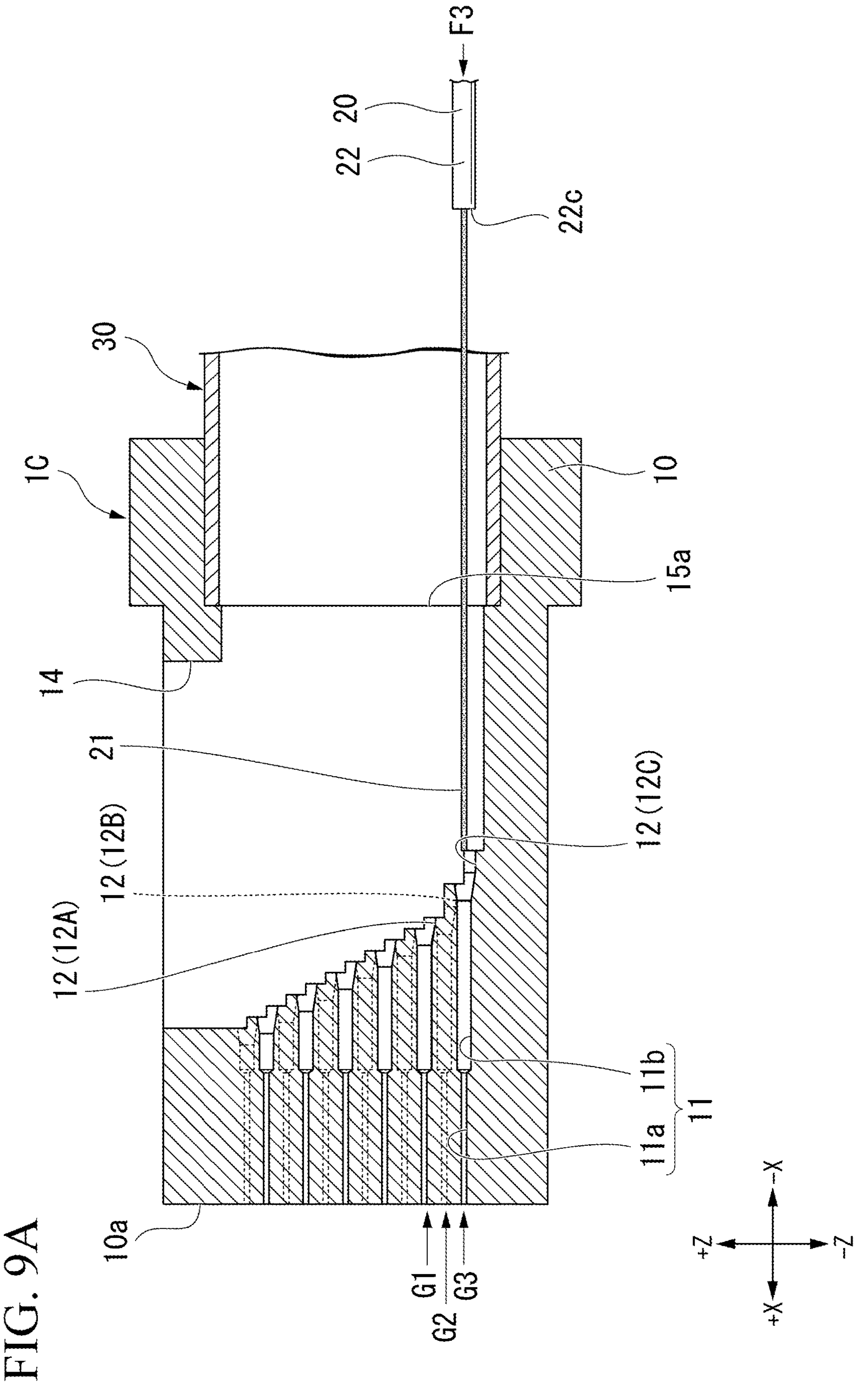
FIG. 9A is a view showing how the optical fiber is inserted into a ferrule and a boot in FIG. 8.

Next, as shown in FIG. 9A, each bare portion 21 of the third fiber group F3 is brought into contact with the inner surface of each third guide groove 12C. At this time, the operator may visually recognize each bare portion 21 and each third guide groove 12C through the window 14 while adjusting the relative positions therebetween.

Figure 9B:
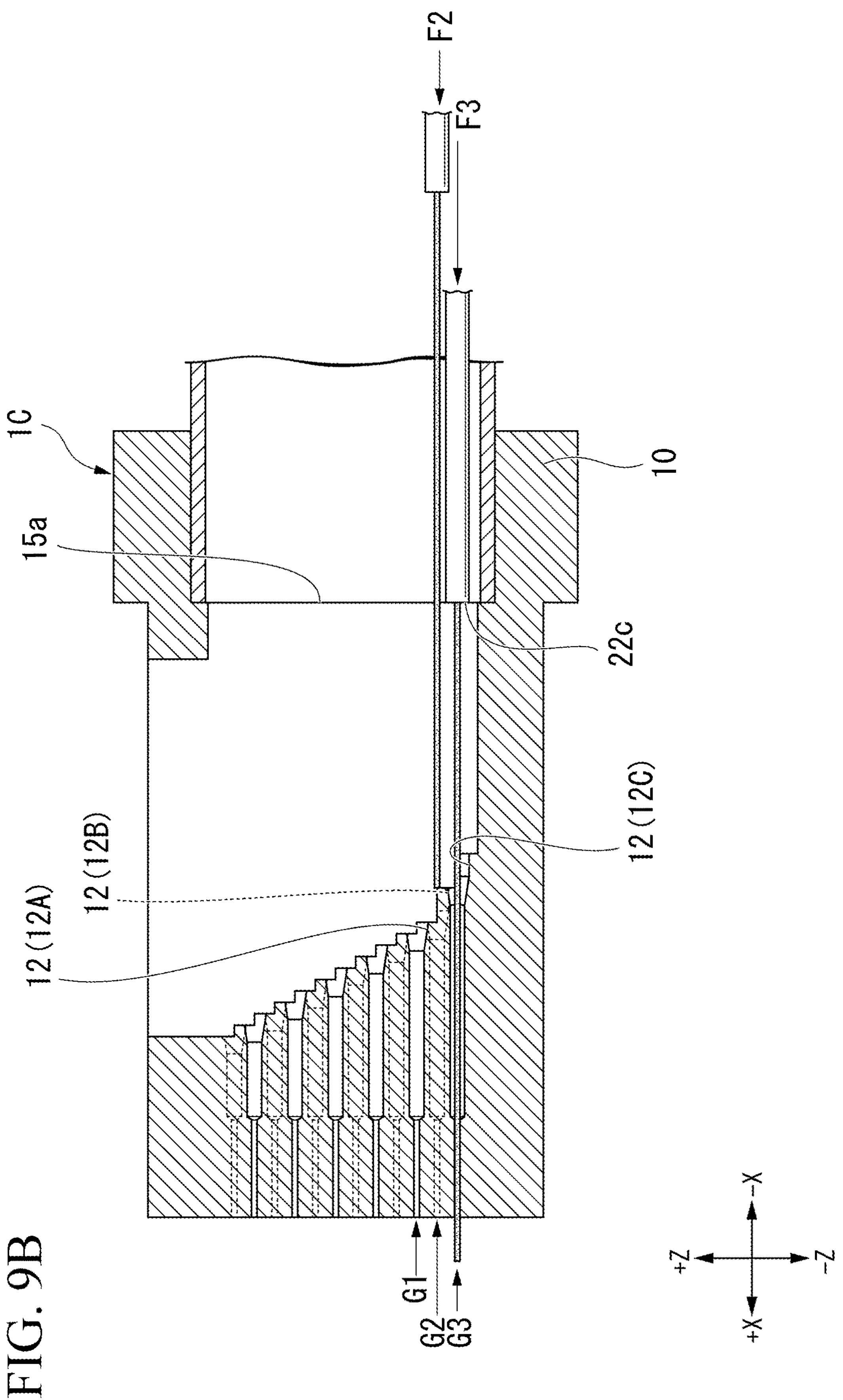
FIG. 9B is a diagram showing a step following FIG. 9A.

Next, the third fiber group F3 is pushed forward. At this time, each bare portion 21 is moved along the inner surface of each third guide groove 12C and the inner surface of the fiber hole 11 (third fiber hole) of the third hole group G3, and is guided toward the tip of the third fiber hole. That is, the third fiber group F3 is guided to the third hole group G3 through the first insertion process described above. When the third fiber group F3 continues to be pushed forward, the tip portion of each bare portion 21 protrudes forward from the connecting end face 10*a* (see FIG. 9B).

Figure 9C:
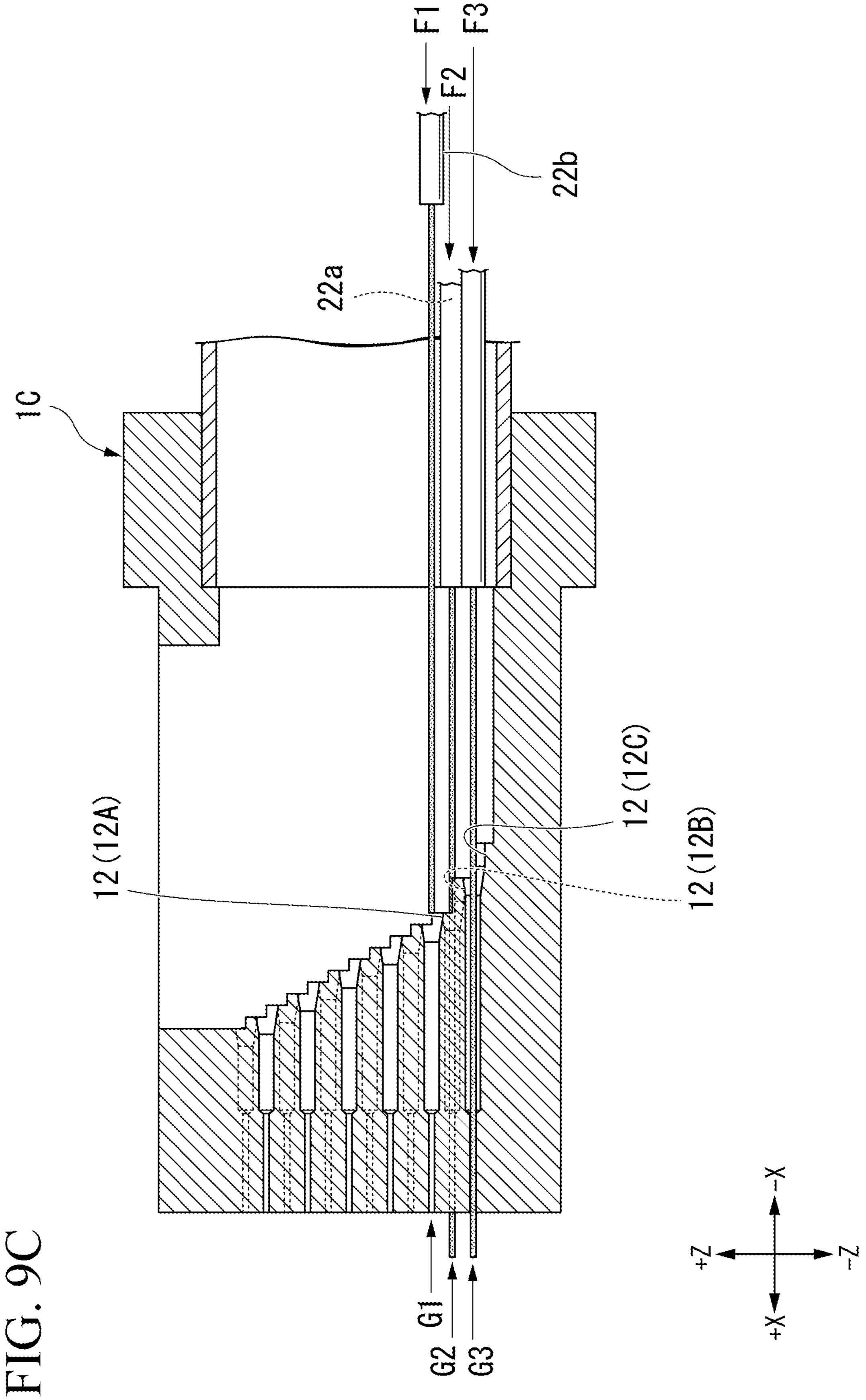
FIG. 9C is a diagram showing a step following FIG. 9B.

Next, the second fiber group F2 is inserted into the second hole group G2 through the second insertion process described above. That is, the second fiber group F2 is guided toward the second hole group G2 (second fiber hole) by the concave portion 22*a* of the third fiber group F3 and the second guide groove 12B. Thereafter, the second fiber group F2 is pushed forward, and insertion into the second hole group G2 is completed (FIG. 9C).

Figure 9D:
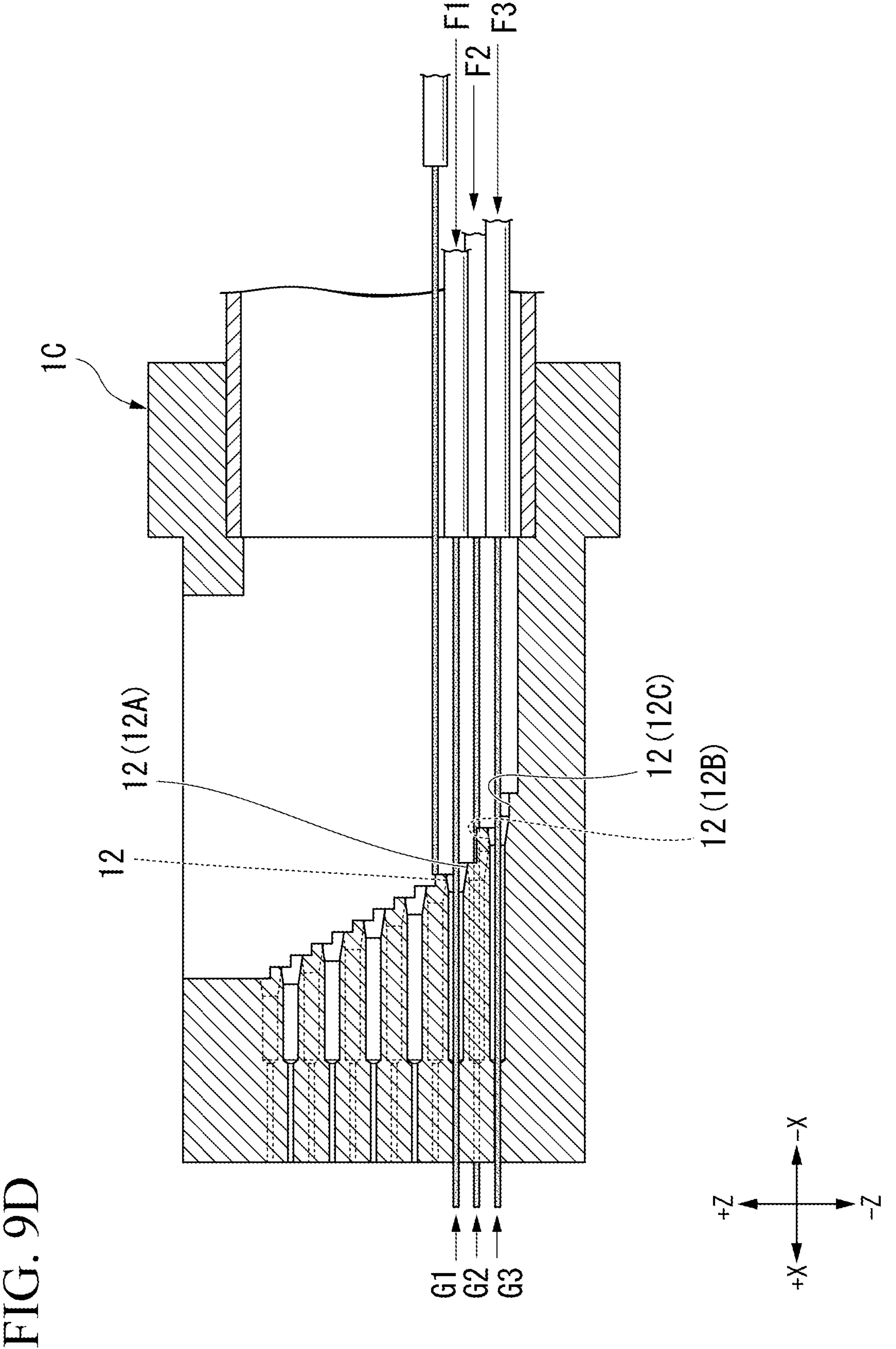
FIG. 9D is a diagram showing a step following FIG. 9C.

Next, the first fiber group F1 is inserted into the first hole group G1 through the second insertion process described above. That is, the first fiber group F1 is guided toward the first fiber hole by the concave portion 22*a* of the second fiber group F2 and the first guide groove 12A. Thereafter, the first fiber group F1 is pushed forward, and insertion into the first hole group G1 is completed (FIG. 9D).

Thereafter, similarly, the fiber group above the first fiber group F1 is inserted into the hole group above the first hole group G1 through the second insertion process.

After all the optical fibers 20 have been inserted through the ferrule 1C, the adhesive is cured by heating. Thereby, the optical fiber 20 is fixed to the ferrule 1C. When the bare portion 21 protrudes from the connecting end face 10*a*, the protruding portion is cut off. Further, the connecting end face 10*a* is polished as necessary. Thus, the manufacture of the optical connector C is completed.

Note that the injection and heat curing of the adhesive may be performed after inserting all the fiber groups into the ferrule 1C.

As described above, also in the ferrule 1C of the present embodiments, the dimension of the second guide groove 12B in the insertion direction X is larger than the dimension of the first guide groove 12A. Therefore, the same effects as the effects of the first embodiments can be obtained.

Further, the third guide groove 12C has a larger dimension in the insertion direction X than the dimension of the first guide groove 12A. Therefore, the same effects as the effects of the second embodiments can be obtained.

Further, in the present embodiments, a plurality of hole groups are provided above the first hole group G1. Therefore, it is possible to connect larger number of optical fibers 20. Furthermore, it is possible to be set the guide groove 12 for inserting the optical fiber 20 into the hole group above the first hole group G1 shorter than the third guide groove 12C and the second guide groove 12B. Therefore, even if the plurality of fiber holes 11 are arranged in multiple rows in the second direction Z, it is possible to prevent the dimension of the ferrule 1C in the insertion direction X from increasing, compared to the case where the dimensions of the guide grooves 12 in respective stages are equal to each other.

It should be noted that the technical scope of the present invention is not limited to the above-described embodiments, and various modifications can be made without departing from the spirit of the present invention.

For example, in the above-described embodiments, the second hole group G2 or the third hole group G3 is located at the lowest position among the plurality of hole groups. However, another hole group may be formed below the second hole group G2 or the third hole group G3. In this case, the window 14 is also formed on the body portion lower surface 10*c*, and the ferrule may be turned upside down in the vertical direction when inserting the optical fiber 20 into the other hole group. Then, the optical fiber 20 may be inserted through the fiber hole 11 while the internal space S of the ferrule is viewed through the window 14 formed in the body portion lower surface 10*c*.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A, 1B, 1C: Ferrule (ferrule for optical connector)
10: Body portion
10*a*: Connecting end face
10*b*: Body portion upper surface (upper surface)
10*c*: Body portion lower surface (lower surface)
11: Fiber hole
12: Guide groove
12A: First guide groove
12B: Second guide groove
12C: Third guide groove
14: Window
20: Optical fiber
21: Bare portion
22: Coated portion
G1: First hole group
G2: Second hole group
G3: Third hole group
F1: First fiber group
F2: Second fiber group
F3: Third fiber group
S: Internal space
P: Pitch
R: Outer diameter

What is claimed is:

1. A method for manufacturing an optical connector, comprising:
- preparing a ferrule for an optical connector comprising:
  - a body portion having:
    - fiber holes into which optical fibers are inserted; and
    - a connecting end face through which the fiber holes are opened, wherein
  - the fiber holes include:
    - first fiber holes disposed at a predetermined pitch in a first direction on the connecting end face; and
    - second fiber holes disposed at the predetermined pitch in the first direction and at positions different from positions of the first fiber holes in a second direction orthogonal to the first direction,
  - the positions of the second fiber holes are shifted by substantially half the predetermined pitch in the first direction with respect to the positions of the first fiber holes,
  - an upper side of the body portion is closer to the first fiber holes in the second direction than to the second fiber holes,
  - a lower side of the body portion is closer to the second fiber holes than to the first fiber holes,
  - a rear side of the body portion is opposite to the connecting end face in an insertion direction of the fiber holes,
  - the body portion further has, inside:
    - first guide grooves extending rearward from respective rear end portions of the first fiber holes and opening upward in a cross-sectional view perpendicular to the insertion direction; and
    - second guide grooves extending rearward from respective rear end portions of the second fiber holes and opening upward in the cross-sectional view, and
  - the second guide grooves are longer in the insertion direction than the first guide grooves;
- inserting second optical fibers into the second fiber holes along the second guide grooves; and
- moving first optical fibers while in contact with surfaces of the second optical fibers that had been inserted into the second fiber holes such that the first optical fibers reach the first guide grooves and inserting the first optical fibers into the first fiber holes individually.

2. The method for manufacturing an optical connector according to claim 1, wherein, during the moving of the first optical fibers and the inserting of the first optical fibers, the first optical fibers contact an upper surface of the second optical fibers in a concave portion formed by the upper surface of the second optical fibers.

* * * * *